United States Patent [19]

Montali

[11] Patent Number: 4,927,319
[45] Date of Patent: May 22, 1990

[54] DEVICE FOR DETERMINING A PRESET NUMBER OF CONTAINERS, PARTIALLY INSERTED WITHIN ONE ANOTHER FORMING A PACKAGE OF THE SAME CONTAINERS

[75] Inventor: Gian Luigi Montali, Vignola, Italy

[73] Assignee: S.T.S. SRL, Anzola Emilia, Italy

[21] Appl. No.: 221,863

[22] Filed: Jul. 20, 1988

[30] Foreign Application Priority Data

Aug. 3, 1987 [IT] Italy .................. 4934/87[U]

[51] Int. Cl.$^5$ .............................................. B65G 59/10
[52] U.S. Cl. .............................. 414/788.4; 221/277; 414/790.32; 414/795.6; 414/798.9
[58] Field of Search ............... 221/277; 414/795.5, 414/795.6, 798.9, 788.2, 788.4, 789.9, 790.3, 798.4, 798.6, 798.7, 797.3, 797.7

[56] References Cited

U.S. PATENT DOCUMENTS

| | | | |
|---|---|---|---|
| 1,927,151 | 9/1933 | Blasco | 414/795.5 X |
| 3,323,680 | 6/1967 | Beer | 414/795.6 X |
| 3,491,633 | 1/1970 | White . | |
| 3,497,086 | 2/1970 | Adams et al. . | |
| 3,756,371 | 9/1973 | Neil | 414/795.6 X |
| 3,756,452 | 9/1973 | Buhayar et al. | 414/795.6 X |
| 3,759,303 | 9/1973 | Henrichs et al. . | |
| 3,790,022 | 2/1974 | Lind . | |
| 4,052,250 | 10/1977 | Potts | 414/795.6 X |
| 4,054,212 | 10/1977 | Mueller | 414/795.6 |
| 4,511,134 | 4/1985 | Hughes | 221/277 X |

FOREIGN PATENT DOCUMENTS 0136052 4/1985 European Pat. Off. .
2715487 10/1977 Fed. Rep. of Germany .

*Primary Examiner*—Robert J. Spar
*Assistant Examiner*—Janice Krizek
*Attorney, Agent, or Firm*—Stevens, Davis, Miller & Mosher

[57] ABSTRACT

The device comprises a base featuring a belt upon which a row of containers rests being moved by the belt through the space between two bars until the top part of the edge of the container at the front of the row strikes against the edge of a disc, the outside circular rim of which is divided into sectors, each of which is turned through a predetermined angle on its related radial axis. The disc is made to rotate in direction until the number of sectors having passed the point of contact with the row is the same as the number of containers which are required to compose a package of containers, each package being then sent to a wrapping machine.

3 Claims, 2 Drawing Sheets

DEVICE FOR DETERMINING A PRESET NUMBER OF CONTAINERS, PARTIALLY INSERTED WITHIN ONE ANOTHER FORMING A PACKAGE OF THE SAME CONTAINERS

BACKGROUND OF THE INVENTION

This invention concerns a device for forming packages of containers, each package being composed of a preset number of containers which are partially inserted within one another.

DESCRIPTION OF THE PRIOR ART

There are known types of devices which carry out the counting of containers and the formation of the resultant packages in the manner described below.

The containers may, in particular, be plastic beakers destined for use in the food industry.

The device usually operates in conjunction with a wrapping machine which subsequently wraps each package of containers.

The containers are aligned, partially inserted within one another, in a row that is kept horizontally aligned by suitable guide means.

The row is pushed in a predetermined direction by moving the base upon which it rests, a base that can be a closed loop belt that runs over a series of motorised rollers.

A toothed wheel is supported so that it is located above the row with its axis of rotation horizontal and perpendicular to the row of containers.

The pitch of the teeth of this wheel and its position are such that the edges circumscribing the openings of the containers, edges which project radially from the row one after another, can be inserted progressively between one tooth and the next during the forward movement of the row.

The wheel idles in only one direction of rotation in accordance with the direction of the forward movement of the row of containers, and is connected to means able to detect its movement and count the number of complete revolutions or fractions of revolutions through which it turns as a result of the forward movement of the row itself.

The containers are thus counted by the wheel, which is stopped, together with the belt, when a package comprising the preset number of containers is formed downstream of the row.

Suitable means, generally comprising appropriately shaped calipers grip the newly formed package and push it over to the wrapping machine.

One problem encountered with the device described above results from the low sensitivity of the toothed wheel with regard to the edges of the containers.

It is in fact possible for two successive containers to be too far inserted one within the other, so that the two related edges are in close contact, and there is no space for the tooth of the wheel, which should separate and count the containers, to be inserted between them.

In this way it can sometimes occur that two contiguous edges, instead of one single one, are inserted between two successive teeth of the wheel, and two containers are made to move forwards at the same time.

On other occasions, due to the fact that the teeth of the wheel follow a descending trajectory in relation to the row of containers, a tooth could strike full against the edge of a container, deforming the latter and comprising the entire packet that will subseuqently be formed.

A further problem encountered with the device described above consists in the fact that there needs to be a different and corresponding size of toothed wheel for each size of container handled.

One final and very important drawback consists in the fact that the operating stages of the device demand a considerable amount of time for the calipers to transfer the package.

The device must indeed halt the flow of containers for the entire period during which the calipers operate, only starting it up again when the calipers have returned to their original position.

SUMMARY OF THE INVENTION

The object of the present invention is to propose a device able to form a package comprising a preset number of containers without there being any possibility of one of these containers being damaged, by operating radially on the head of the container instead of on its edge, or of making up packages containing a different number of containers than has been preset.

A further object of the present invention is to propose a device able to run at a higher operating speed than the device described in the introduction, by, to be specific, avoiding the occurrence of dead time as much as is possible.

A final object of the present invention is to propose a machine that can easily be adapted to different sizes of containers by employing a technical solution that is, nevertheless, both effective and easy to produce.

The said objects of the present invention are achieved by means of a device for determining a preset number of containers that are partially inserted within one another, forming a package of these same containers, the said device being of the type comprising first means for moving a row of containers; second means for guiding the same row; third means for effecting the forward movement of the above-mentioned containers one at a time in relation to the aforesaid row in order to form a package of these same containers; fourth means for pushing the aforementioned package in a forwards direction; the said device being characterised by the fact that the above-mentioned third means comprise a disc that is located above the said row, and divided, along its outside circular rim, into a series of sectors, each sector being turned through a predetermined angle on its related radial axis; the said disk being able to turn around an axis parallel to the said row, in a predetermined direction, causing the rims of the successive sectors to be progressively inserted between the contiguous edges of the pair of containers at the front of the above-mentioned row, in order to separate them from one another by imposing a forwards movement on the first one, due to the inclined shape of the said rim, and retaining the second one.

BRIEF DESCRIPTION OF THE DRAWINGS

The characteristics of the inventions not to have emerged so far are emphasised hereinafter with specific reference to the enclosed tables of drawings, in which.

DESCRIPTION OF THE PREFERRED EMBODIMENT

Figure 1:
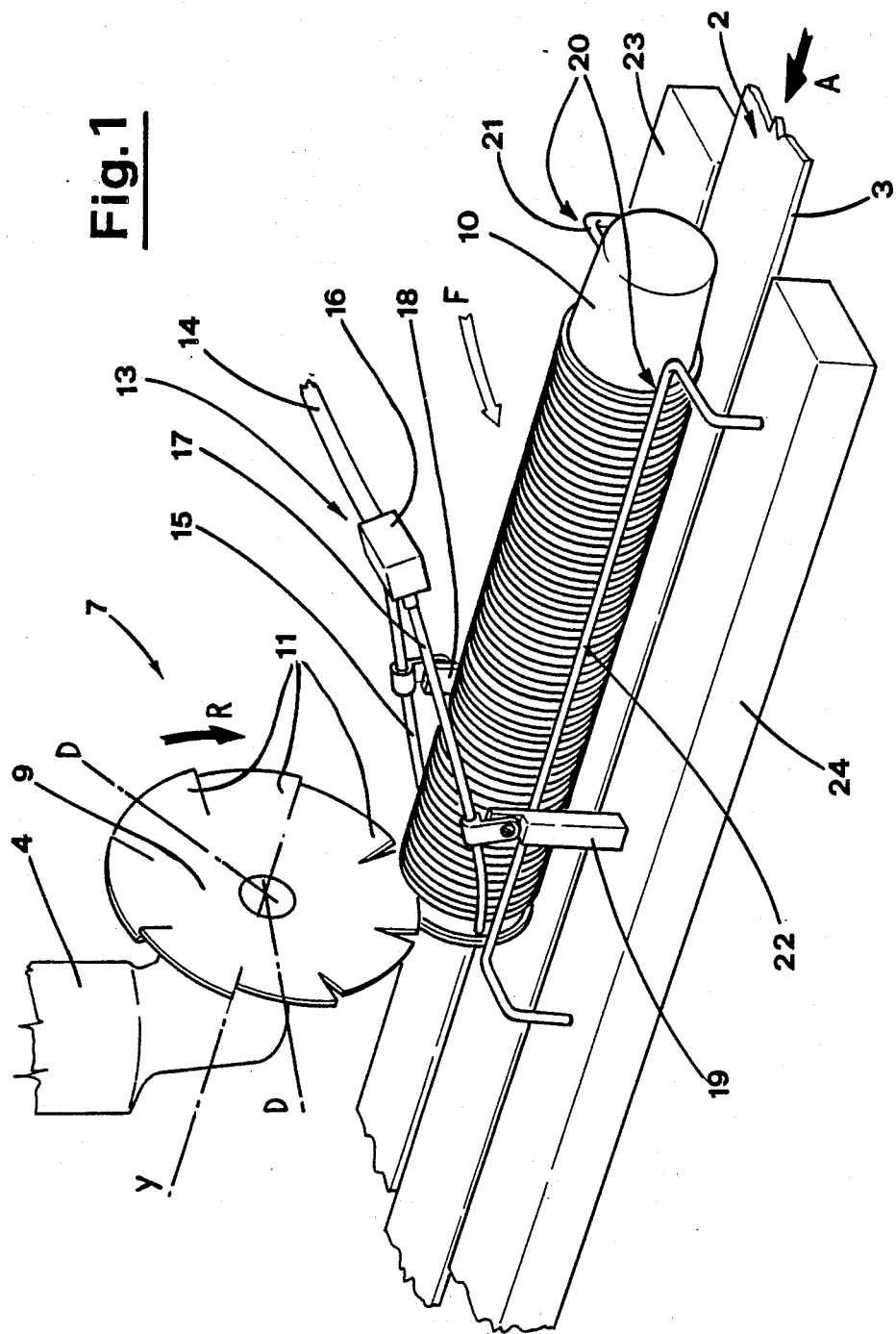
FIG. 1 is a diagrammatic illustration in perspective of the device which is the subject of the present invention.
Figure 2A:
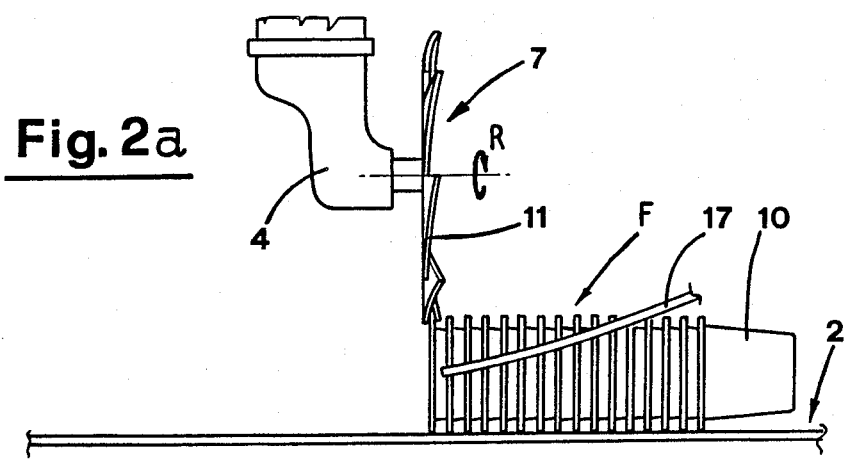
FIGS. 2a, 2b and 2c are diagrammatic illustrations, seen from one side, of the device in three subsequent operating stages respectively.
Figure 2B:
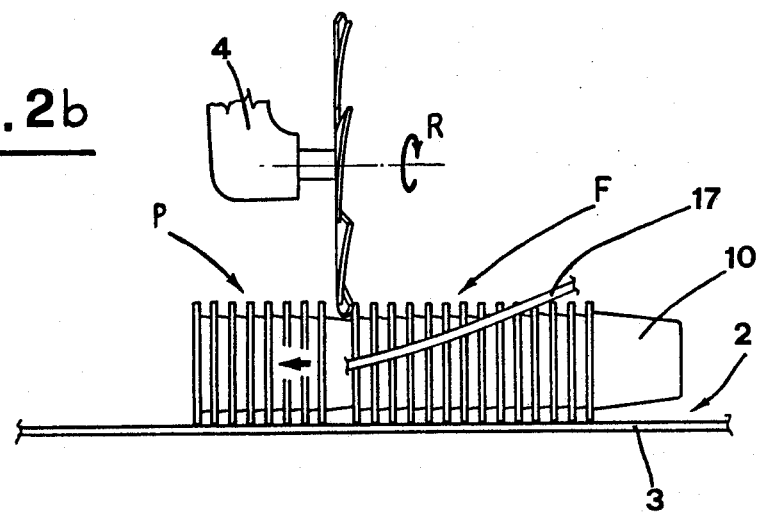
Figure 2C:
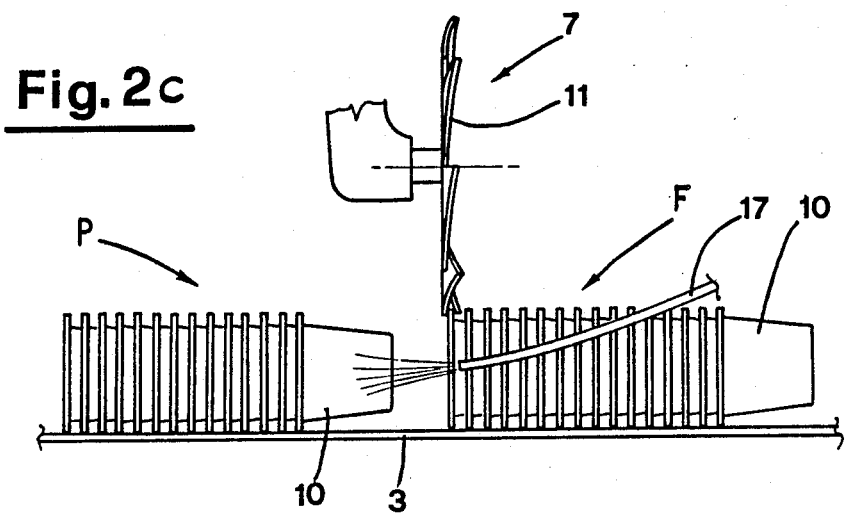

With reference to the said figures, shown at F is a row of containers 10 that are partially inserted within one another.

The row is resting upon a base 2 in such a way as to be aligned in a certain direction, horizontally, for example, and is subjected to the action of means which tend to push it in a predetermined direction A.

In the case under consideration these means take the form of base 2 itself, and comprise a closed loop belt 3 that runs over a series of motorised rollers (not illustrated).

Guide means 20, comprising a pair of horizontal bars 21 and 22, mounted on corresponding structures 23, 24, are positioned on either side of the belt 3.

The row F moves through the space between the two bars 21 and 22.

Means 7 for determining the number of containers 10 required to form a package P of containers 10 downstream of the row F, are located above the belt 3. These packages of containers 10 are subsequently sent to a wrapping machine, (not illustrated since not pertaining to the present invention), that is located so as to effect a drop-in feed from the device.

Means 7 consist in a disc 9, the outside circular rim of which is divided into sectors 11, each of which is turned through a predetermined angle on its related radial axis D.

The number of degrees in the aforesaid angle is sufficient for the distance between the contiguous rims of two successive sectors 11 to permit the edge of a container 10 to be inserted between them at a point on the outer circumference of the disc 9.

The disc 9 is mounted on support means 4 with its axis Y parallel to the row F, slightly above the latter, and is driven so that it rotates (using means of known type, not illustrated) in a predetermined direction R.

The row F, composed of containers 10 all of which are oriented with their openings facing the disc 9, is pushed in direction A by the belt 3 until the top part of the edge of the container 10 at the front of the row strikes against the edge of the disc 9, with the latter stopped, causing the entire row to be halted.

The disc is then made to rotate in direction R until the number of sectors to have passed the point of contact with the row is the same as the number of containers 10 which are required to compose each package P.

The device can, however, also be fitted with means (of known type, not illustrated) for counting the containers moved on by the disc 9, such as encoders, photocells, or other mechanical or electronic devices.

During the rotation of the disc the outside rim of every sector 11 is inserted between the edges of the first two containers 10 of the row F, subsequently pushing the first container forwards while retaining the second in position, which then in its turn becomes the front container. The following sector is then moved round and its rim is inserted between the edge of the second container and the edge of the third container, operating in the same way as described above for the preceding sector, and so on until the predetermined number of containers 10 has been moved further downstream of row F.

The present invention also features pushing means 13 comprising two ducts 15 and 17 that are connected to a compressed air supply via valved means 16 and a pipe 14.

The ends of the ducts 15 and 17, through which the compressed air is expelled, are respectively located beside the row F at a point corresponding to the zone of the belt 3 where the package P is formed.

The ducts 15 and 17 are held firmly in the correct position by means of anchoring means 18 and 19 respectively which are mounted on structures 23 and 24.

When the package P of containers has been completely formed downstream of disc 9, the disc 9 and belt 3 are momentarily stopped, while the valved means 16 are activated, causing a jet of compressed air to be briefly expelled from ducts 15 and 17.

The air jets cause the package P to be moved in direction A until causing the package P to be introduced in the wrapping machine.

Immediately after the package has been moved, which takes an extremely short period of time, the belt 3 and disc 9 are once again activated to form a new package P.

In another embodiment of the present invention means 7 comprise a pair of eccentric discs that are located on either side of the row F, with their relevant axes of rotation parallel to the latter, with the distance between one and the other being sufficient to permit the edge of a container 10 to be inserted between the two discs. The distance between the axes of rotation of the eccentrics from the row F is such that successive rotations through 180 degrees, following the activation of motor means of known type (not illustrated) acting on the same eccentrics, cause the latter to insert themselves one after the other between the edges of the first two containers.

With the eccentrics stopped, the first container of the row F strikes its edge up against one of the two eccentrics, the right-hand one, for example, which is positioned in such a way as to intercept the row, stopping it.

Rotation of the left-hand eccentric through 180 degrees first, and then of the right hand one, frees the first container and stops the second, which becomes the new front container in the row.

The subsequent rotation through 180 degrees of the two eccentrics returns the device to all of its initial conditions.

The two eccentrics must then be rotated through 360° for the same number of times as the number of containers required to form each package P.

In a further embodiment of the invention means 7 comprise a pair of screws (or helicoids) which are located on either side of the row F with their axes of rotation parallel to the latter.

The distance of the axes of rotation from the row F are sufficient for the edges of the front container to engage with the screws, which are made to rotate in opposite directions and in synchrony with one another by known means (not illustrated), conveying the container further downstream of the row F.

The screws are made to rotate for a whole number of turns until the number of containers downstream of the row reaches the predetermined number of containers required to form a package P.

It is clear that the device which is the subject of the present invention is able to determine the number of containers with accuracy, rapidity and above all with practically no possibility of error, in both the embodiment illustrated in the figures and in the other embodiments described (but not illustrated).

In addition to this, there is undoubtedly also a total reduction in the number of containers that can be damaged, due to the precise operation of the present device and the manner of insertion of means 7 between the contiguous edges of the successive containers at the front of the row, always effected following a trajectory that is tangential to the edges themselves, in such a way that the action of these same means 7 is applied more to the head of the container than to the outside surface of the relevant edge.

It should finally be emphasised that all dead time is completely eliminated, in that the belt 3 and means 7 only interrupt the flow of containers for the amount of time strictly necessary to move the package P which has been formed downstream of the row F; this period of time being limited to an absolute minimum through the use of the technical solution described above.

It is understood that the description supplied herein is solely an unlimited example, such that possible variations in the construction details will not affect the protective framework afforded to the invention as described above and claimed hereinafter.

What is claimed is:

1. A device for determining a preset number of containers that are partially inserted within one another to form a package of the same containers, said device comprising first means for moving a row of said containers; second means for guiding said row; third means for effecting a forward movement of said containers one at a time in relation to said row in order to form a package of said containers; fourth means for pushing said package in a forward direction; with the said third means comprising a circular disc that is located above the said row so that said row strikes with its front against a lower part of the peripheral rim of said disc, said peripheral rim of said disc being divided into a series of sectors, each sector being turned through a predetermined angle with respect to a plane which contains said disc's center; said disc being able to rotate around a central axis parallel to said row, in a predetermined direction, causing said sectors to be one by one inserted between contiguous edges of a pair of said containers at said front of said row, in order to separate said containers from one another by imposing a forward movement on said first container, and retaining said second container in the row.

2. The device as in claim 1, wherein said fourth means comprise a series of ducts located at the sides of said row with the ends of said ducts positioned in a zone where a package of said containers is formed, said ducts being connected to a compressed air supply via valved means that can be activated in synchrony with the formation of said package.

3. The device as in claim 1, wherein each of said sectors has a profile which develops a helicoidal trajectory.

* * * * *